May 28, 1963 H. FERNANDEZ-MORAN VILLALOBOS 3,091,144
METHOD OF CUTTING SUBSTANCES
Original Filed Oct. 6, 1954 3 Sheets-Sheet 1

INVENTOR
HUMBERTO FERNANDEZ-MORAN VILLALOBOS

BY
ATTORNEY

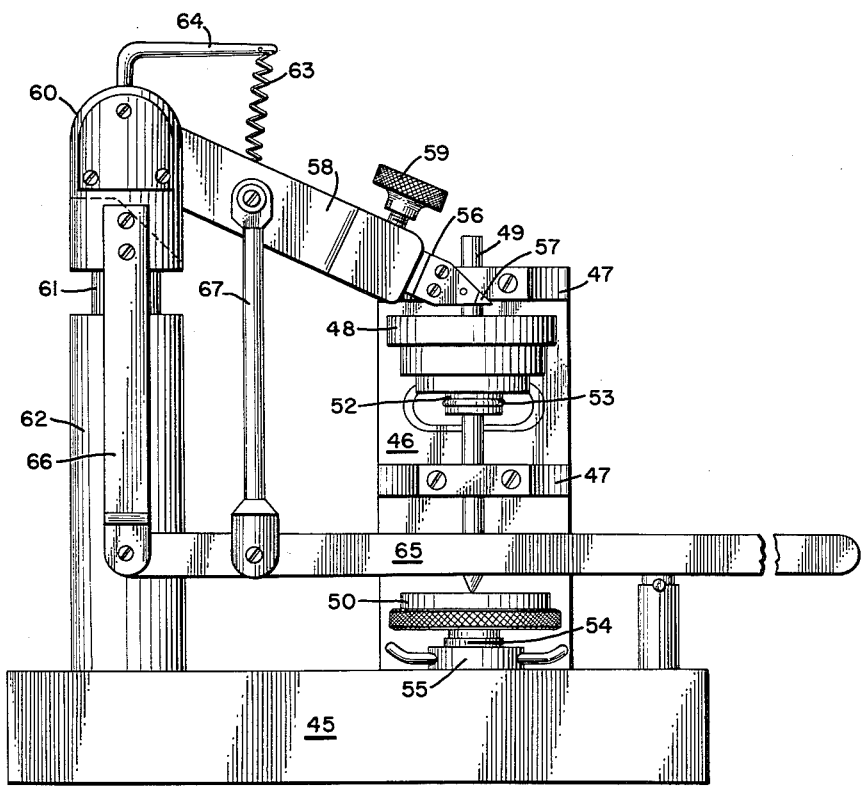

United States Patent Office 3,091,144
Patented May 28, 1963

3,091,144
METHOD OF CUTTING SUBSTANCES
Humberto Fernandez-Moran Villalobos, Villagatan 9-11, Stockholm, Sweden
Original application Oct. 6, 1954, Ser. No. 460,745, now Patent No. 2,961,908, dated Nov. 29, 1960. Divided and this application Jan. 5, 1960, Ser. No. 5,328
2 Claims. (Cl. 83—15)

This application is a division of application Serial No. 460,745, filed October 6, 1954, which issued as Patent No. 2,961,908 granted November 29, 1960.

The invention relates generally to improvements in a method for molecular sectioning.

An object of the invention is to provide a method by which sections having molecular or sub-molecular thickness (0.01–0.001 micron) may be cut from macromolecular substances.

In microtomes previously used the rotor has been journalled in cylindrical bearings. Such a bearing will always show a little lost motion, even if made with great accuracy, and this lost motion will tend to further increase by wear. Thus, it has not been possible to center the rotor sufficiently to obtain ultrathin sections of reproducible thickness. A V-bearing, on the other hand, can easily be machined to any degree of precision and ensures a required high degree of stability and reproducibility of the circular motion independently of a more or less exact centering of the rotor. A little wear of the V-bearings is of no importance, as the rotor is still kept wedged between the bearing surfaces.

By the radial mounting of the holder or holders for the material to be cut the improved effect of the V-shaped bearings is utilized fully. Further, such mounting makes it possible to place a number of holders along the rotor in its longitudinal direction, if desired along a screw line around the rotor, whereby several work pieces may be handled simultaneously in cutting sections of equal or different thickness.

The cutting edge may consist of steel, hard metal or glass, as known per se. However, these materials are not useful for producing ultrathin sections having a thickness in the range of 0.01–0.001 micron. When a finished edge of steel or hard metal is observed in great magnification, the edge line will appear as a wave line, and in connection with the thin sections here in question such irregularities would involve essential variations as to the thickness. Therefore, according to a preferred embodiment of the invention the cutting tool consists of a diamond which is ground very smooth. A diamond knife can be ground to obtain an absolutely straight edge line, and its edge can be given an extraordinary sharpness of 2–50 A.U. (Angstrom units) by means of a special sharpening and polishing process which will be described in the following. Since the hardness of diamond is unsurpassed and its crystalline structure makes it possible to obtain stable cutting edges of such molecular thickness, the use of this knife extends the cutting range of the instrument to metals, crystals and all other hard substances which cannot be cut with previously available knives. On the other hand, the improved microtome according to the invention has made it possible for the first time to take advantage of the improved efficiency of such a diamond knife.

The thin and ultrathin sections (10–0.001 micron) obtained with this microtome in its preferred embodiment show complete preservation of the fine structure and integrity of the structural relationships of the specimen down to the molecular and atomic level. The sections are therefore ideally suited for examination with light microscope (specially with phase contrast microscope), electron microscope and X-ray microscope, or examination by electron diffraction or X-ray diffraction methods. Generally the sections are suited for all methods of structural, physical and chemical analysis.

Since the sectioning process carried out by this microtome in its preferred embodiment (diamond knife) does not alter the physical and chemical properties of the specimen, it can be used to divide completely small pieces of crystals, amorphous material and all other stable substances in solid state into intact sections of a thickness down to 0.001 micron. The thin or ultrathin sections obtained in this way can be used for all physical, physicochemical and chemical experiments where thin layers of crystalline and amorphous matter of these dimensions are required. As an example it may be mentioned that thin and ultrathin intact sections of germanium and other semiconductors can be prepared to be used in manufacturing transistors and similar elements.

When using a diamond knife or a cutting edge of hard metal the machine according to the invention can also be used as an "ultra-lathe," and "ultra-cutter" or an "ultra-planing machine" for machining pieces of metals and other hard solids down to tolerances of 0.001 micron. When applied in combination with specially polished diamond edges, the machine can produce polished surfaces of a degree of finish superior to that obtained by any of the known mechanical polishing procedures.

The use of the microtome indicated above has also resulted in the development of a new method, by which sections having molecular or sub-molecular thickness can be cut from macromolecular substances. The substance in question is first cooled to a temperature below −70° C., preferably to a temperature between −180° C. and −250° C., and is then cut with a diamond knife having an edge thickness of at most 0.003 micron. Owing to the rapid feed of the substance onto the cutting knife as a result of the rapid expansion caused by such a low starting temperature the sections must be cut at a rate of at least 100 per second, i.e. the rotor must have a speed of rotation of at least 6000 r.p.m. Another reason for such a high cutting speed is to prevent intervening chemical or physical changes of the surface of the substance. Thus, by using this method it has been possible to cut virus into molecules consisting of inactive nucleoprotein acids. As a further example may be mentioned that starch molecules probably can be cut into glucose molecules. Still further applications may easily be found by a man skilled in the art.

The invention will be more closely described hereinafter with reference to the accompanying drawings, though this detailed description must in no way be considered as involving any limitation.

In the drawings:

FIG. 4 shows the same grinding machine as seen from the side.

Figure 1:
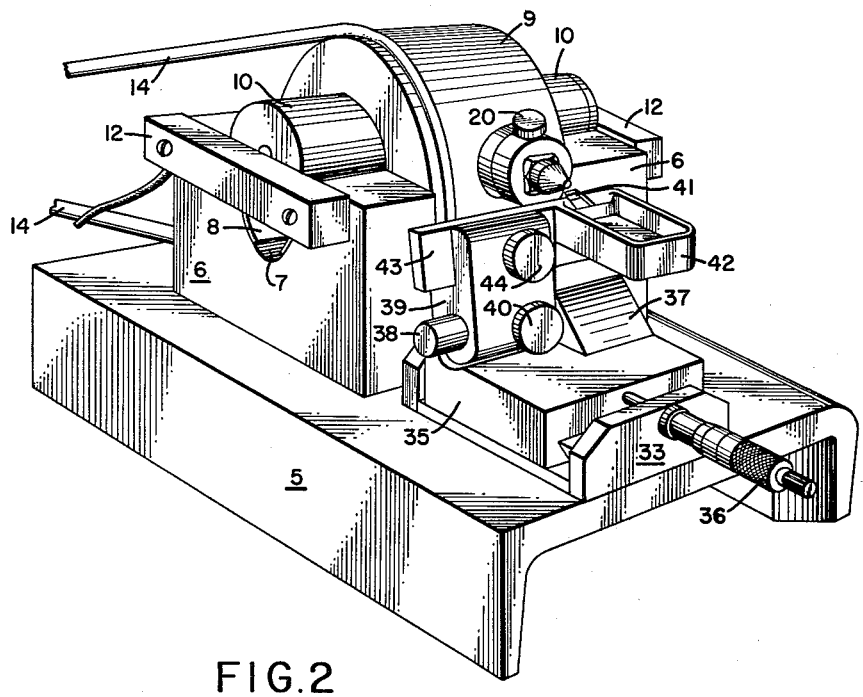
FIG. 1 is a perspective view of an embodiment of a microtome.
Figure 2:
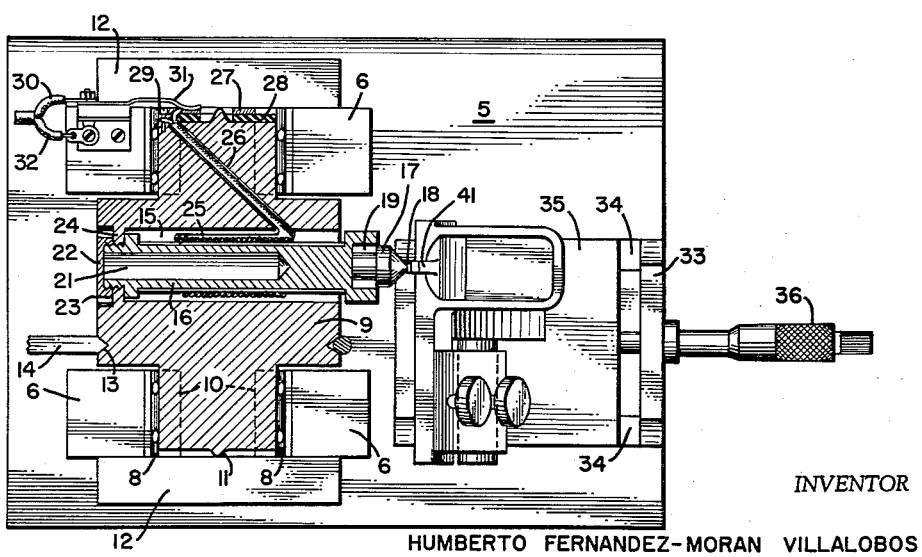
FIG. 2 shows the same microtome as seen from above and partly in section.

Referring to FIGS. 1 and 2, the operative parts of the machine are supported by a base plate 5. Two bearing blocks 6 containing horizontal V-shaped grooves 7 are fixed to the plate at a distance from each other and with the two grooves in alignment. The two side surfaces of each groove are covered with smooth polished and carefully adjusted plates 8 of some hard material. In dependence on the demands on the machine this material may be bronze, glass, hard-metal, quartz, diamond etc. If necessary, some suitable lubricant may be put on to reduce the friction of the bearing surfaces. The angle between the bearing surfaces in each bearing is in no way critical but may be varied within wide limits in dependence on the size and intended speed of rotation of the rotor.

The rotor is of solid metal, preferably hardened steel, and comprises a cylindrical middle portion 9 made integral with two end portions 10 having a somewhat smaller diameter to serve as pivots for the rotor. The pivots which are journalled in the V-shaped bearings described above are highly polished to reduce the friction. Rounded, highly polished tips 11 project from the ends of the pivots 10 in alignment with the axis of the rotor and are adapted to engage supporting beams 12 which are adjustably screwed to the blocks 6 at the outer ends of the V-shaped grooves. By this arrangement any movement of the rotor in axial direction is prevented. If desired, the tip engaging surfaces of the beams may be of hard metal.

The rotor 9 has a peripherical groove 13 to receive a driving belt 14 of a motor (not shown) which is preferably placed at a somewhat lower level. Further, the rotor has a diametrical hole 15 adapted to receive a rod or tubular member 16. One end of said member carries a holder 17 for a piece of material 18 to be cut. The holder 17 is inserted into an axial boring 19 in the rod end and is fixed by means of a screw 20. The rod 16 is somewhat longer than the diameter of the rotor 9, so that the end carrying the holder projects outside the hole 15. The opposite end of the rod is also provided with a boring 21 which is considerably deeper. Said latter end which is adapted to be fixed in the hole 15 is threaded externally to receive a screw cap 22. When tightening the cap, a flange on the rod 16 is pressed onto an intermediate annular abutment 24 within the hole 15, whereby the rod is effectively fastened. For reasons of heat conductivity the rod is dimensioned not to contact the surrounding hole 15 at any other place.

An insulated, electric heating coil 25 is wound around the middle portion of the rod 16. If desired, however, a heating element may instead be inserted in the boring 21. The connection wires of the coil 25 are led through a channel 26 in one of the pivots 10. One of the wires is connected to a metallic ring 27 fixed to a ring 28 of insulation material at the end of the pivot, while the other wire is earthed by means of a screw 29 inserted in the rotor. One conduit 30 from the source of energy is connected to a sliding contact 31 engaging the ring 27, while the other conduit 32 is earthed in the bearing block 6.

In front of the rotor the base plate 5 carries a fixed frame portion 33 having guide rails 34 on which a slide 35 is movable to and from the rotor by means of a micrometer screw 36. On its upper side the slide has a bracket 37 carrying a projecting pin 38 which is directed in parallel to the axis of the rotor. An arm 39 with a fork-shaped end is pivoted on the pin to be fixed in any desired position by means of a stop screw 40. The diamond used as cutting tool is fixed in a suitable alloy and mounted in a holder which must have great stability to avoid detrimental vibrations. The holder is provided at one end of a rectangular trough 42 adapted to contain a liquid, for instance a water-alcohol mixture, glycerine or oil, on the surface of which the sections obtained are to be collected. The trough is preferably made integral with a bar 43 projecting in parallel to the edge of the cutting tool and introduced into the fork-shaped end of the arm 39 to be held by a screw 44. There is an optimal cutting angle (2–20°) for every type of material to be cut, and this angle must be determined to avoid the sections getting spoiled when cut. Such determinations can only be performed experimentally in each separate case.

The feeding of the work piece or preparation towards the cutting diamond is carried out by subjecting the rod 16 to a thermal expansion. At the same time the rotor 9 is caused to rotate at a certain constant speed. The thermal expansion may be effected by heating, in that a constant current of low intensity is supplied to the electric heating coil 25. This procedure which is applicable within a range of temperature from 0° C. and up to about 400° C. may be used for cutting metals and the majority of other substances which are solid at normal or higher temperature. Alternatively the rod may first be cooled down to a temperature below about −180° C. by means of a cooling medium, such as carbon dioxide snow, liquid air, liquid hydrogen or liquid helium supplied to the boring 21. The rod then expands, as its temperature slowly rises. In such case, the temperature of the surrounding atmosphere is kept between −15° C. and room temperature. The latter method, making possible such a low temperature as −250° C., is particularly advantageous for cutting sections of materials which are more or less liquid at normal temperature.

The thickness of the sections will, of course, be dependent on the heating velocity of the rod and its thermal expansion coefficient as well as on the speed of rotation of the rotor. The heating velocity is preferably kept as constant as possible from case to case and may be determined by means of calibration. The thermal expansion coefficient may be varied by using rods of different materials. When cutting rather thick sections (0.02–0.2 micron) rods of metals, such as steel, brass or aluminum are to be preferred, while on the other hand thin and ultrathin sections (0.001–0.01 micron) may be obtained by rods of for instance invarnickel steel or tubes of quartz or glass. As described above the rod has such a mounting that it may easily be substituted.

In most cases the speed of the rotor is kept at 50–100 r.p.m., although, as mentioned, it is possible to work at considerably higher speeds up to 100,000 r.p.m. In the latter case, however, the rotor must be very well balanced, and the bearing surfaces must be of hard metal or precious stones.

If a particular low feed speed for the work piece is desired, for instance in connection with a low speed of rotation of the rotor, this may be effected in that the rearmost plates of the V-shaped bearings, as seen in relation to the cutting tool, are heated instead of the rod. At such heating the whole rotor is moved forward in the direction of the edge, although this movement will be of a very slight magnitude.

The diamond used as cutting tool is preferably of the type industrial diamond (Brazilian or Venezuelan boarts). It may have a weight of 0.2–0.5 carat and an edge of 2.5–3.5 mm. length. The edge angle is preferably kept between 50 and 80° depending on the material to be cut. About 60° is most suitable for cutting soft and elastic or plastic materials, while 75–80° is most suitable for cutting metals and other hard materials.

When grinding the edge I make use of the fact that certain industrial diamonds, for instance boarts, are built up of submicroscopic layers (the thinnest only 0.001–0.005 micron thick), the diamonds being easy to cleave along the planes of these layers. The irregular edges obtained by such cleaving are first smoothed by grinding with fine diamond powder on a smooth iron disk according to the method generally used for polishing diamonds.

To obtain particularly sharp and smooth edges (0.001–0.01 micron) this grinding must be followed by a polishing with ultrafine diamond, diamantine or aluminum oxide powder having an average particle size of 0.001–0.005 micron (controlled in electron microscope). The polishing could be carried out with an extremely good effect by using an apparatus constructed exclusively for this purpose and described below.

Figure 3:
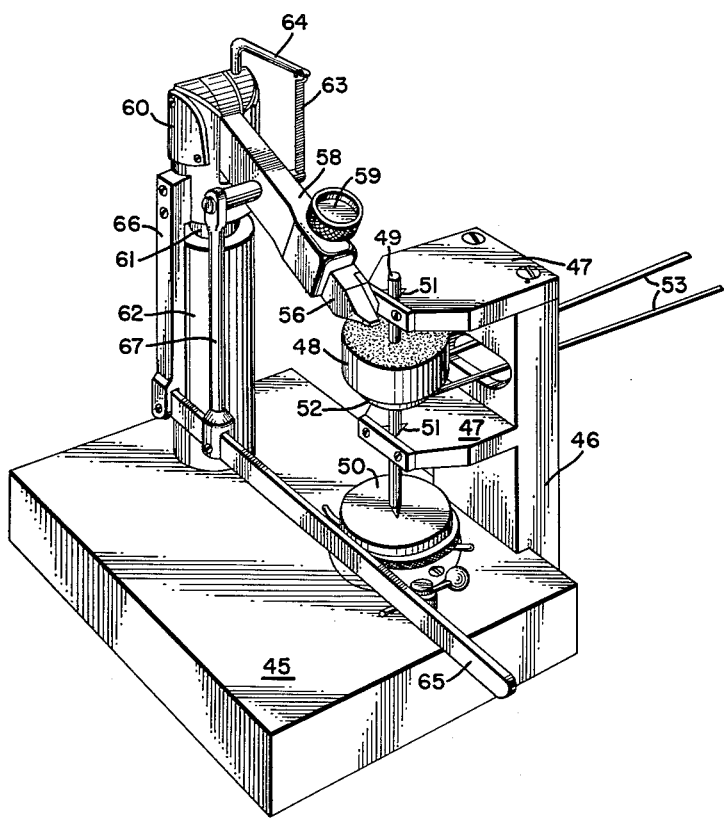
FIG. 3 shows a perspective view of a suitable machine for grinding the cutting diamonds.

The apparatus shown in FIGS. 3 and 4 operates according to the principle that a diamond, the edge of which is to be sharpened is fastened to the end of a pivotable lever and advanced towards the surface of a rotating disk covered by a paste containing the ultrafine powder. The apparatus is built on a base plate 45. A post 46 carrying two brackets 47 is fixed to one edge of said plate. The grinding disk 48 is carefully balanced and centered around a vertical shaft 49 joined to it, and its upper surface (the grinding surface) is carefully polished. The pointed lower end of the shaft 49 rests on a polished, adjustable plate 50 of hard metal, carborundum or possibly diamond. The shaft is journalled in two V-bearings 51 of bronze or diamond provided in the two brackets 47. A pulley 52 is fixed to the shaft 49 below the grinding disk and is to be driven by a motor (not shown) by means of a belt 53. The grinding disk as well as the pulley are placed between the two bearings 51, and the elevation may be adjusted by turning the plate 50 which is fixed to a screw 54 threaded into the base 45. A locking washer 55 keeps the screw fixed in the adjusted position.

The electric driving motor can have a speed of rotation of 5,000–40,000 r.p.m. By means of some suitable gear reduction the grinding disk may be driven at a speed varying from 10,000 up to 400,000 r.p.m. In most cases speeds between 20,000 and 40,000 r.p.m. are used. For producing extremely sharp cutting edges, however, speeds between 50,000 and 400,000 r.p.m. may be to prefer. Owing to the combination of V-bearings and a pointed supporting end of the shaft the balanced grinding disk gets an entirely smooth and vibrationless motion even at the highest speeds.

A holder 56 for the diamond 57 to be sharpened is mounted in the sleeve-shaped outer end of a lever 58 and may be fixed in any desired position by means of a screw 59. The lever is pivotable around a horizontal pivot inserted in a fork-shaped member 60 which is fastened to the upper end of a vertical column 61. This latter, in turn, is rotatably journalled in a vertical cylinder 62 mounted on the base plate 45.

The lever 58 is normally held in a lifted position over the grinding disk by a spring 63 which is suspended in a rod 64 projecting from the fork 60. One end of another lever 65 is pivoted to the lower end of a rod 66 extending downwards from the fork 60. A link 67 connects the two levers 58 and 65 with each other. Thus, the diamond holder 56 may be raised and lowered as well as swung in horizontal direction by means of the lever 65 serving as operating handle.

The ultrafine powder used for the grinding is obtained by means of repeated centrifugation and ultracentrifugation (about 60,000 r.p.m.) of an oil suspension of fine powder. When a powder of desired grain size has been separated off, it is dispersed in a suitable liquid to a paste which is smeared in a thin layer on the grinding disk. The previously ground diamond is mounted in the holder and carefully brought into contact with the grinding material along its whole edge. The operation is controlled all the time in a microscope (30 times magnification). A skilled expert may in this way obtain an extremely sharp edge which appears as an entirely straight line even when magnified 1400–20,000 times. The appearance of the edge is of decisive importance for the quality of the sections produced by the microtome.

When using the microtome provided with a diamond knife which is ground and polished as described above, it has been possible to produce and to examine in an electron microscope ultrathin sections of materials as different as metals, for instance aluminium, copper, cast iron and germanium, different types of crystals, bone, biological tissues embedded in methacrylate resin, and frozen parts of fresh biological tissues. The sections are for instance prepared in the following way.

The material to be cut is fastened in the holder 17 provided for this purpose. If the material is a metal or a biological preparation embedded in plastic, the holder is insulated against heat when mounted in the rod 16. The diamond edge and the liquid-filled trough behind it are slowly advanced towards the preparation by means of the micrometer screw 36 under control in a microscope, until the edge gets into contact with the preparation. The rotor is started and caused to rotate at a speed of about 100 r.p.m. The electric current to the heating coil 25 is switched on and controlled by a micro amperemeter. The current intensity is regulated by a precision rheostat. After 2–3 minutes the rod begins to expand and to advance the preparation and the cut sections flow from the knife edge onto the liquid surface like a continuous band. The sections are taken up in the known way by means of a grating covered by a thin film of collodium or the like. At a normal running for 15–20 minutes, until the rod is no more heated and expanded by the heat supplied, 1000–5000 sections may be obtained.

The invention is not restricted to the embodiment shown and described, but various modifications may be performed within the scope of the inventional idea.

What I claim is:

1. A method of producing sections of molecular thickness having dimensions of the order of 0.01–0.001 micron from macromolecular substances, which comprises cooling the substance to a temperature below about −180° C., cooling a holder for the substance to be cut to a temperature below about −180° C., mounting said substance to be cut on said holder, rotating said holder and the substance thereon adjacent a diamond knife having an edge thickness of at most 0.01 micron, allowing said holder to expand by heating to thereby cause feeding of said substance to said knife, and cutting said substance into sections at a rate of the order of 100 separate independent sections per second, the surrounding atmosphere being maintained between −15° C. and room temperature.

2. A method of producing sections of a thickness of the order of at most 0.01 micron of frozen, fresh biological tissues and tissue components which comprises cooling said tissues and tissue components to a maximum temperature of about 180° C., cooling a holder for the substance to be cut to a temperature of at most about −180° C., mounting said substance to be cut on said holder, rotating said holder and the substance thereon adjacent a diamond knife having an edge thickness of at most 0.01 micron, allowing said holder to expand by heating to thereby cause feeding of said substance to said knife, and cutting said tissues and tissue components into sections at a rate of the order of 100 separate independent sections per second, the surrounding atmosphere being maintained between −15° C. and room temperature.

References Cited in the file of this patent

UNITED STATES PATENTS

| | | |
|---|---|---|
| 2,144,901 | Stopp | Jan. 24, 1939 |
| 2,421,926 | Coronel | June 10, 1947 |
| 2,670,657 | Smith | Mar. 2, 1954 |
| 2,860,623 | Muench | Nov. 18, 1958 |